INVENTOR.
T. YAMASHITA

//  
United States Patent Office 3,011,944  
Patented Dec. 5, 1961

3,011,944  
COMPOSITION FOR ELIMINATING TOXIC EFFECTS OF NICOTINE AND METHOD OF USING SAME  
Taizo Yamashita, Tokyo, Japan, assignor to Zaidan Hojin Nagao Kenkyusho, Tokyo, Japan, a corporation of Japan  
Filed Oct. 8, 1956, Ser. No. 614,440  
Claims priority, application Japan July 21, 1956  
7 Claims. (Cl. 167—55)

This invention relates to a medical composition which acts not only to eliminate the toxic effects of nicotine absorbed by smoking in a human body but also to make use of it for the purpose of nutrition and, more particularly, to a medical composition containing riboflavin, thiamine, pyridoxine and glycyrrhetinic acid as effective components.

The toxic effects of smoking on a human body are well known. Resulting blood vessel contraction causes an extremely high blood pressure. It is also known that the injurious component thereof is nicotine.

Various attempts have heretofore been made to counteract such toxic effects of nicotine, for example, by prohibiting smoking or by using a pipe having a filter device filled with a certain medicine, etc. No smoking is the best way to accomplish the purpose; but, on the other hand, it is most difficult in practice.

The inventor has discovered that the injurious effect of nicotine can be utilized advantageously, that is, the nicotine which has been absorbed in a body can be converted into a nutritive substance without causing any injurious effects on the body.

The object of this invention is to provide a medical composition which may counteract the toxic effect of nicotine absorbed by smoking in a human body.

Another object of this invention is to provide a medical composition which may act to convert the above nicotine into a nutritively available substance in a human body.

Figure 1:
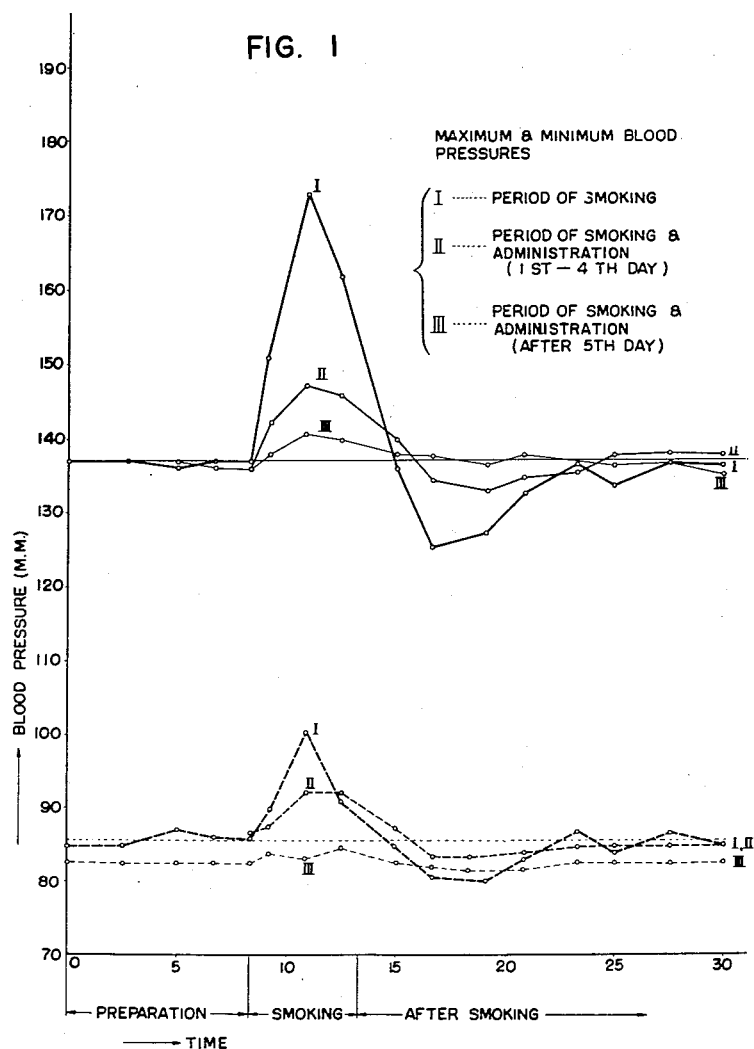
Figure 2:
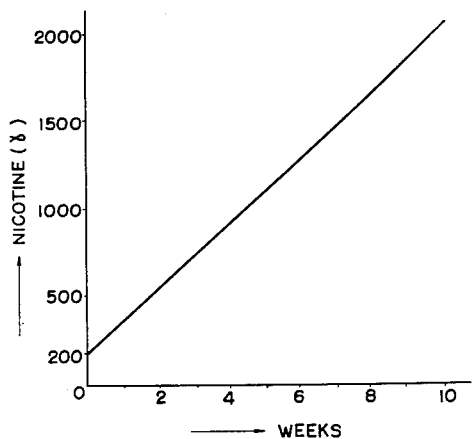
Figure 3:
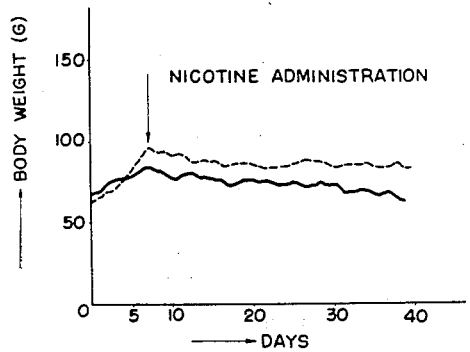
Figure 4:
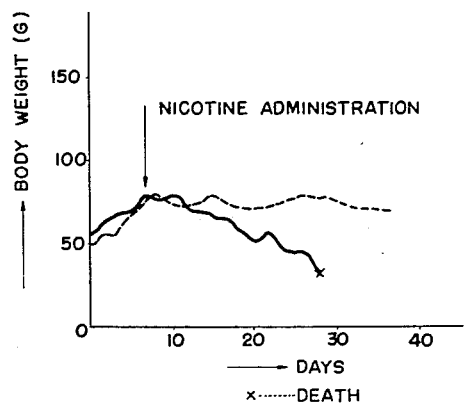
Figure 5:
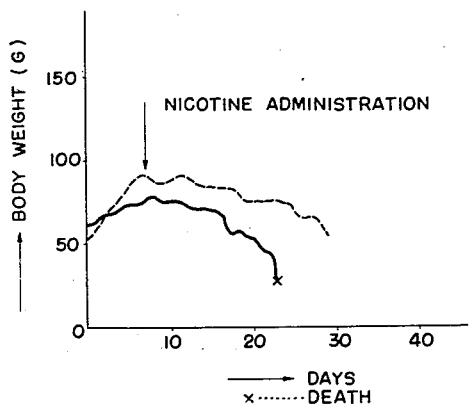
Figure 6:
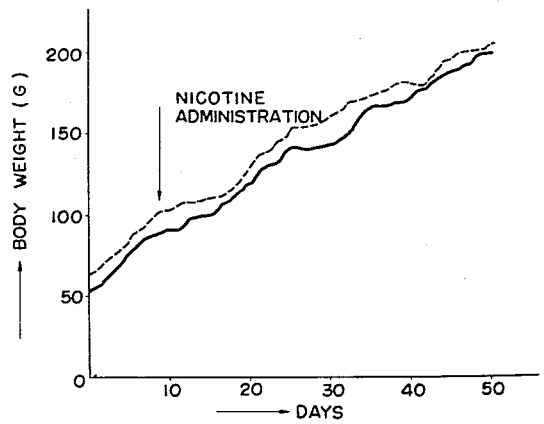
Figure 7:
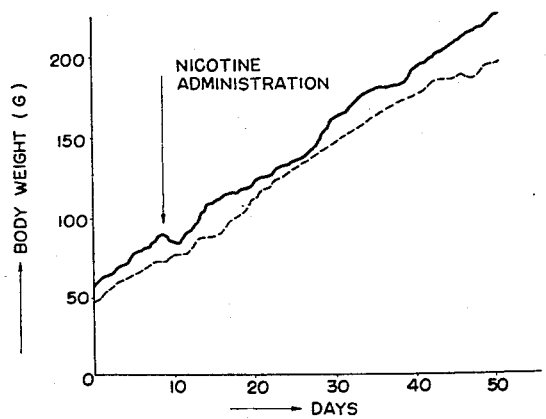

In the drawings, FIG. 1 is a diagram showing the effect of the present composition with the variation of blood pressures when smoking. FIG. 2 shows the amount of nicotine taken by a rat per day. FIGS. 3–7 are respectively diagrams showing changes of body weight of mice when the amount of nicotine as shown in FIG. 2 is taken.

The composition of this invention may be prepared by mixing a known carrier or carriers in any known way to the riboflavin, thiamine, pyridoxine and glycyrrhetinic acid which constitute the essential components of this composition. The above carrier may be a liquid or a solid, and the above composition may be prepared in a given form suitable for oral administration, such as tablets, powders, capsules, and the like. For example, the above riboflavin, thiamine, pyridoxine and glycyrrhetinic acid may be intimately mixed with a solid carrier, e.g., cornstarch, lactose, stearc acid, magnesium stearate, gum and the like to produce a product in any known way. A liquid carrier may be substituted for the above solid carrier. It will be, of course, understood that the carrier should be compatible with the above components without causing any reaction therewith. It is also desirable that the effective components are at least one percent of the composition.

It appears that the successive or habitual use of the present medical composition is effective to convert the nicotine absorbed by smoking in a body into nicotinic acid. It is due chiefly to an oxidizing and reducing action of riboflavin. As is well known, nicotinic acid is a substance effective for nutrition of the human body.

It is presumed that the oxidizing and reducing action of riboflavin may be activated by virtue of the presence of thiamine, pyridoxine and glycyrrhetinic acid. The administration of the medical composition of the present invention will lead blood to have the function of converting injurious nicotine into useful nicotinic acid. Also, glycyrrhetinic acid is useful for the increase in bodyweght in cooperation with the above action of riboflavin because said acid has an effect of strengthening liver.

A pure crystal may be of course available as a source to supply riboflavin. Mycelium of *Eremothecium ashbyii* may also be used as it is. The mycelium contains 4 to 6 mg./g. of riboflavin. As is readily appreciated, therefore, at least a part of the riboflavin may be replaced by a mycelium of *Eremothecium ashbyii*. Thiamine and pyridoxine may preferably be used in the form of pure crystals. Glycyrrhetinic acid is an active component of a liquorice. These effective components are most useful when the relative amount of thiamine, riboflavin and pyridoxine is (2 to 4):(4 to 6):1. The amount of glycyrrhetinic acid required is about 10 to 1000 based upon the amount of pyridoxine.

The invention will now be described with reference to the following examples and these examples will not limit the scope of the present invention.

EXAMPLE 1

(a) *Method of test*

Thirty mice were divided into the following three groups, i.e., A, B and C so that each group contained ten mice.

Group A: "Nicosan" has been supplied every day through oral administration in an amount of 1 mg. per 10 g. of the body-weight for six days before the test day. On the day of test, they were supplied two hours before the test was conducted.

Group B: "Nicosan" was supplied through oral administration in an amount of 1 mg. per 10 g. of the body-weight just two hours before the test.

Group C: Control—no "Nicosan" was supplied.

*Remarks.*—"Nicosan" is a 100 mg. tablet containing 0.5 mg. of thiamine, 1 mg. of riboflavin, 0.25 mg. of pyridoxine, 20 mg. of glycyrrhetinic acid, 15 mg. of powdered liquorice, 0.025 mg. of cinnamon, 0.025 mg. of clove oil, 0.025 mg. of peppermint oil, 0.025 mg. of camphor and 0.05 mg. of menthol, the balance being lactose.

(b) *Method of administration of nicotine*

Nicotine was injected to the mice of groups A to C hypodermically in an amount of 0.375 mg. of nicotine to 10 g. of the body-weight thereof.

(c) *Results of test*

The mice belonging to group C (control) died in agony within several minutes to an hour after the nicotine was injected, while the major parts of those belonging to groups A and B fell temporarily into a state of coma, but all awoke within two hours, recovering to their normal conditions.

| No. of mice | Group A | Group B | Group C |
| --- | --- | --- | --- |
| No. 1 | Recovered after 60 min. | Recovered after 110 min. | Died after 1 min. |
| No. 2 | Recovered after 62 min. | Recovered after 130 min. | Died after 1 min. |
| No. 3 | Recovered after 90 min. | Recovered after 150 min. | Died after 2 min. |
| No. 4 | Recovered after 100 min. | Recovered after 141 min. | Died after 1 min. |
| No. 5 | Recovered after 80 min. | Recovered after 180 min. | Died after 3 min. |
| No. 6 | Recovered after 75 min. | Recovered after 165 min. | Died after 1½ min. |
| No. 7 | Recovered after 82 min. | Recovered after 205 min. | Died after 15 min. |
| No. 8 | Recovered after 79 min. | Recovered after 115 min. | Died after 60 min. |
| No. 9 | Recovered after 65 min. | Recovered after 140 min. | Died after 1 min. |
| No. 10 | Recovered after 68 min. | Recovered after 185 min. | Died after 20 min. |

From the above results, it is concluded that if nicosan has previously been administered to mice, the injection of nicotine in an amount corresponding to lethal dose does not lead them to death and that the counteraction of nicosan appears more strongly when it has been supplied for several days successively before the day of test than when it is supplied on the test day.

EXAMPLE 2

*Determination of the relative amount of riboflavin, thiamine, pyridoxine and glycyrrhetinic acid*

The following medial composition was prepared.

| Sign | Combination | Value |
| --- | --- | --- |
| A | riboflavin + thiamine | 2:2 |
| B | riboflavin + pyridoxine | 2:1 |
| C | thiamine + pyridoxine | 2:1 |
| D | riboflavin + thiamine + pyridoxine | 2:2:1 |
| E | riboflavin + thiamine + pyridoxine + glycyrrhetinic acid | 2:2:1:50 |

Fifty white mice, each weighing about 50 g., which had been breeded with the standard diet for one week, were divided into five groups as shown in the following table so that each group consisted of ten mice.

| Group | Sign | Number of Rats | |
| --- | --- | --- | --- |
| | | Experimental Class | Control Class |
| 1 | A | 5 | 5 |
| 2 | B | 5 | 5 |
| 3 | C | 5 | 5 |
| 4 | D | 5 | 5 |
| 5 | E | 5 | 5 |

Each group was supplied every day with the above combined medicines according to the following table.

The amount of administered medicine per 100 g. of body-weight

| Sign | Medicine |
| --- | --- |
| A | riboflavin 40γ, thiamine 40γ. |
| B | riboflavin 40γ, pyridoxine 20γ. |
| C | thiamine 40γ, pyridoxine 20γ. |
| D | riboflavin 40γ, thiamine 40γ, pyridoxine 20γ. |
| E | riboflavin 40γ, thiamine 40γ, pyridoxine 20γ, glycrrhetinic acid 1000γ. |

In one week, each group was again divided into two classes so that each class had five members, one of the classes being named as control class.

Each group was kept supplied with the medicine, and, except for control class, they were also given water containing nicotine in such amount as shown in FIG. 2.

The results of the above test was as follows.

(1) Members of each group were all well-grown for the first one week, showing the substantially same increase in body-weights, but since then, members of group 1(A), group 2(B) and group 3(C) did not show much increase of body-weights. Members of group 4(D) and group 5(E) were in a very healthy condition and the remarkable increases of their body-weights were observed.

(2) When nicotine was given, the members of group 1, group 2 and group 3 began to weaken rapidly with decrease of body-weights, and they all died at last.

(3) The members of group 4 and group 5 were not substantially affected by the application of nicotine, but rather better grown than that of control group. The increase in the body-weights of the experimental class of group 5 was especially remarkable, which appeared to result from the effect of glycyrrhetinic acid.

The results of the above experiments are diagrammatically shown in FIG. 3 to FIG. 7 with the medicine A to E respectively, wherein the dotted line and the solid line show the average value of control class and the average value of experimental class respectively.

What I claim is:

1. A medicinal composition which consists essentially of from 2 to 4 parts by weight of thiamine, 4 to 6 parts by weight of riboflavin, 1 part by weight of pyridoxine and from 10 to 1000 parts by weight of glycyrrhetinic acid and a carrier therefor.

2. A medicinal composition as claimed in claim 1 in which said carrier is solid.

3. A medicinal composition as claimed in claim 1 in which said carrier is liquid.

4. A tablet which contains, per 100 parts by weight, 0.5 part of thiamine, 1 part of riboflavin, 0.25 part of pyridoxine, 20 parts of glycyrrhetinic acid, 15 parts of powdered liquorice, 0.025 part of cinnamon, 0.025 part of clove oil, 0.025 part of peppermint oil, menthol and the balance lactose.

5. A medicinal composition which consists essentially of from 2 to 4 parts by weight of thiamine, a total of from 4 to 6 parts by weight of at least one member selected from the group consisting of riboflavin and a mycelium of *Eremothecium ashbyii*, 1 part by weight of pyridoxine and from 10 to 1000 parts by weight of glycyrrhetinic acid and a carrier therefor.

6. A method for reducing the increase in blood pressure caused by smoking which comprises administering a composition consisting essentially of from 2 to 4 parts by weight of thiamine, 4 to 6 parts by weight of riboflavin, 1 part by weight of pyridoxine, and from 10 to 1000 parts by weight of glycyrrhetinic acid and a carrier therefor.

7. A method for reducing the increase in blood pressure caused by smoking which comprises administering a composition consisting essentially of from 2 to 4 parts by weight of thiamine, a total of from 4 to 6 parts by weight of at least one member selected from the group consisting of riboflavin and mycelium of *Eremothecium ashbyii*, 1 part by weight pyridoxine and from 10 to 1000 parts by weight of glycyrrhetinic acid and a carrier therefor.

References Cited in the file of this patent

UNITED STATES PATENTS

| 1,842,266 | Hicks | Jan. 19, 1932 |
| 2,198,188 | Viscardi | Apr. 23, 1940 |
| 2,600,700 | Smith | June 17, 1952 |

OTHER REFERENCES

Lathrop: Journal of the American Pharmaceutical Association, Practical Pharmacy Edition, February 1950, pp. 90–94, 128.

Sollmann: A Manual of Pharmacology, Seventh Edition, 1948, Saunders Co., Phila., Pa., page 342.

Chem. Abst., vol. 48, 1954, p. 795a.